(12) United States Patent
Schultz et al.

(10) Patent No.: US 6,242,511 B1
(45) Date of Patent: Jun. 5, 2001

(54) OLIGOMERIC SILANE TREATED METAL HYDROXIDE PRODUCT AND A METHOD OF PREPARING THE SAME

(75) Inventors: Robert Eugene Schultz, Kennesaw; Allen Clay Hendrix, Fairmount, both of GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 09/232,416

(22) Filed: Jan. 15, 1999

(51) Int. Cl.[7] ................................................ C08K 9/06
(52) U.S. Cl. ................................................ 523/212
(58) Field of Search ............................... 523/212

(56) References Cited

U.S. PATENT DOCUMENTS

| | | |
|---|---|---|
| 3,227,675 | 1/1966 | Papalos . |
| 3,350,345 | 10/1967 | Vanderbilt et al. . |
| 4,105,465 | 8/1978 | Berger . |
| 4,526,922 | 7/1985 | Pickwell et al. . |
| 4,550,056 | 10/1985 | Pickwell et al. . |
| 4,711,673 * | 12/1987 | Musselman .................. 106/287.17 |
| 5,282,998 | 2/1994 | Horn et al. . |
| 5,543,173 | 8/1996 | Horn, Jr. et al. . |
| 5,824,729 * | 10/1998 | Matsushita ............................ 524/437 |

* cited by examiner

Primary Examiner—Paul R. Michl
(74) Attorney, Agent, or Firm—Carlos Nieves

(57) ABSTRACT

An oligomeric, silane treated metal hydroxide product for use in an elastomeric or polymeric composition. The product comprises a plurality of metal hydroxide particles surface and an oligomeric silane which includes alkenyl and alkyl groups. The metal hydroxide particles are surface treated by the oligomeric silane. The alkenyl content of the oligomeric silane utilized to treat the metal hydroxide is preferably less than about 12% by wt.

24 Claims, No Drawings

OLIGOMERIC SILANE TREATED METAL HYDROXIDE PRODUCT AND A METHOD OF PREPARING THE SAME

TECHNICAL FIELD

This invention relates to an oligomeric silane treated metal hydroxide product for use as a component in an elastomeric or polymeric composition. More particularly, the invention relates to a silane treated, ground alumina trihydrate product that provides improved mechanical properties and high levels of flame retardancy and smoke suppression in an end use application. The invention also relates to a method of preparing an oligomeric silane treated metal hydroxide product.

BACKGROUND OF THE INVENTION

Alumina trihydrate (also referred to as aluminum hydroxide, ATH, alumina, hydrated alumina, and aluminum trihydroxide) is a white crystalline powder used as a flame retardant and smoke suppressant in a number of applications including polymeric wire and cable compositions. When heated, ATH absorbs heat and releases water. This lowers the surface temperature of the polymeric composition to which the ATH is added which provides a barrier to combustion and dilutes the gases of combustion.

ATH occurs naturally as the mineral gibbsite or hydragyllite, or it is obtained directly from bauxite by the Bayer process which involves the treatment of bauxite with alkali under pressure. A common type of ATH utilized in elastomeric or polymeric compositions is an ultrafine precipitated grade ATH (PATH). PATH has been known to undesirably raise the level of the viscosity of the composition to which it is added. In order to minimize the increase in the viscosity of the composition, it is known to treat the PATH with a silane. Some commonly used silanes used in the treatment of ATH are described in U.S. Pat. Nos. 4,526,922 and 4,550,056. While the silane treatment of PATH promotes lower compound viscosity, the PATH particles still yield relatively high viscosities when added to elastomeric or polymeric formulations.

Ground ATH (GATH) has certain advantages over precipitated materials. For example, GATH filled polymeric composites typically yield lower compound viscosities and improved processing. Further, the surface area of the particles of precipitated ATH products are typically lower than the surface area of the particles of ground ATH products of the same average particle size. Higher surface area provides better flame retardancy and smoke suppression in polymeric formulations. However, this higher surface area of the ground ATH particles, particularly in vinyl silane coupled, peroxide or radiation cured compounds, has a negative impact on elongation at break. The low elongation has prevented GATH grades from replacing PATH grades in many applications such as wire and cable insulation and jacketing compounds.

SUMMARY OF THE INVENTION

The present invention is designed to overcome the deficiencies of the prior art discussed above. It is an object of the invention to provide an oligomeric silane treated metal hydroxide product that provides increased flame retardancy and smoke suppression in elastomeric and polymeric compositions.

It is a further object of the invention to provide such a metal hydroxide product which, when added to a polymeric composition, does not have a significant impact on the physical properties of the same.

It is another object of the invention to provide a method of treating a metal hydroxide product with an oligomeric silane that promotes improved manufacturing quality and consistency.

In accordance with the illustrative embodiments and demonstrating features of the present invention, there is provided an oligomeric silane treated metal hydroxide product for use in an elastomeric or polymeric formulation. The product comprises a plurality of metal hydroxide particles such as ground alumina trihydrate particles and an oligomeric silane which includes alkenyl and alkyl groups. The metal hydroxide particles are surface treated by the oligomeric silane. The alkenyl content of the oligomeric silane utilized to treat the ground alumina trihydrate is preferably less than about 12% by wt.

DETAILED DESCRIPTION OF THE PREFERRED EMBODIMENTS

In accordance with the preceding summary, the present invention is directed toward an oligomeric silane treated metal hydroxide product having improved physical characteristics. The invention is also related to a method of making such a product.

The mechanism for attaching a silane to a mineral surface, e.g. alumina trihydrate, is well understood. When the mineral is treated with a silane it is imperative that the silane comes into contact with substantially every mineral particle. Moisture, present on the surface of the mineral and in the air causes the silane to hydrolyze. The resulting silanol is then free to react, first by hydrogen bonding and then via a condensation reaction, with a hydroxyl group on the mineral surface. Certain processing problems are known to exist. Specifically, since monomeric silanes have low molecular weights, a certain amount of the silane is vaporized during the treatment process and never makes it to the mineral surface. This is particularly the case in surface treatment processes where the freshly treated product is air conveyed to packaging stations or storage silos (i.e., continuous processes). The lost silane ends up in a dust collector or is blown off into the atmosphere.

Two known monomeric silanes are vinyltriethoxysilane and vinyltrimethoxysilane. Ground ATH products treated with such monomeric silanes do not yield sufficient physical properties in end use applications. Another commercially available vinyl silane is vinyl-tris(2-methoxyethoxy) silane. However, this silane has been identified as a teratogen and its use has, therefore, been limited. A fourth known silane is believed to be a blend of an oligomeric methyl silane and a monomeric vinyl silane. Such a blend was developed by Union Carbide and is sold under the trade name RC-1 by Witco. While RC-1 offers some improvement over monomeric silanes, a drawback associated with RC-1 is that during treatment of the ground ATH more of the volatile monomeric vinyl silane component is lost than the oligomeric methyl silane. This is attributed to the fact that the reaction rate between the silane blend and the ATH is relatively slow. FTIR analysis has shown that the ratio of monomeric vinyl silane to oligomeric methyl silane changes depending on the type of process used to treat the ATH. The loss of vinyl content has a negative impact on end use performance. Further, silane loss results in increased manufacturing costs. Each of the above referenced silanes are described in U.S. Pat. Nos. 4,526,922 and 4,550,056. GATH products treated with these silanes do not provide compound elongation properties high enough to meet many industry specifications. As a result end users are not able to take advantage of GATH's lower compound viscosity and improved flame retardant and smoke suppressant properties.

A comparison of the performance of each of these silanes on a 1.5 micron GATH product sold under the mark Micral® 1500 by J. M. Huber Corporation is set forth in Table I.

TABLE I

Cross-Linked EVA 55% Loading of 1.5 micron Micral ® 1500 GATH

| | Final Mix Torque (m-g) | 100% Modulus psi | Tensile Strength psi | Elongation % |
|---|---|---|---|---|
| Vinyltrimethoxysilane | 8,800 | 2598 | 2822 | 128 |
| Vinyltriethoxysilane | 8,700 | 2477 | 2823 | 159 |
| Vinyl-tris(20-methoxyethoxysilane) | 9,200 | 1996 | 2114 | 245 |
| RC-1 | 9,000 | 2171 | 2547 | 179 |

Table II shows the effect of these silanes on a 1 micron PATH product sold under the mark Micral® 9400.

TABLE II

Cross-Linked EVA 55% Loading of 1 micron Micral ® 9400 PATH

| | Final Mix Torque (m-g) | 100% Modulus psi | Tensile Strength psi | Elongation % |
|---|---|---|---|---|
| Vinyltrimethoxysilane | 9,400 | 1985 | 2762 | 183 |
| Vinyltriethoxysilane | 10,700 | 1760 | 2486 | 191 |
| Vinyl-tris(20-methoxyethoxysilane) | 10,600 | 1674 | 2127 | 258 |
| RC-1 | 10,600 | 1684 | 2472 | 141 |

It is well known that the high surface area of GATH provides more surface for interfacial bonding with the resin than lower surface area PATH. During a peroxide or radiation (free radical) cure the vinyl groups attached to the ATH form covalent bonds coupling the resin to the ATH. More coupling occurs in the case of GATH so more of the resin becomes immobilized during the cure. For this reason, GATH promotes higher tensile strength and lower elongation than PATH. This effect is demonstrated in Tables I and II above.

It has been discovered that improved mechanical properties ultimately can be obtained when ground ATH particles are treated with certain higher molecular weight, oligomeric silanes. It should also be noted that improved properties can be achieved when precipitated ATH particles are treated with these oligomeric silanes. However, the ATH particles to be treated are preferably of the ground type as they yield lower compound viscosities and improved flame retardancy and smoke suppression in polymeric formulations.

Oligomeric silanes are less volatile than monomeric silanes so that less silane is lost when used to treat ATH. Further, the reaction rate of the oligomeric silane to the ATH surface is dramatically improved as more fully described below. In the preferred embodiment, oligomers of 2-alkenylalkoxy silanes and alkylalkoxy silanes are used to treat the alumina hydroxide. Some preferred oligomeric silanes are disclosed in U.S. Pat. No. 5,282,998, the disclosure of which is incorporated by reference thereto as if fully set forth herein. Two oligomeric silanes disclosed in the '998 patent include an oligomer of a vinyltrimethoxy silane and an isobutyltrimethoxy silane (methoxy version) and an oligomer of a vinyltriethoxy silane and an isobutyltriethoxy silane (ethoxy version). Other oligomers of vinylalkoxy and vinylaryl silanes also can be utilized.

It also should be noted that other unsaturated silanes such as methacrylalkoxy silane could be used instead of a vinylalkoxy silane since such silanes have similar crosslinking performance characteristics.

An illustrative example of the structure of an oligomer of a vinylalkoxy silane and an alkylalkoxy silane is set forth immediately below.

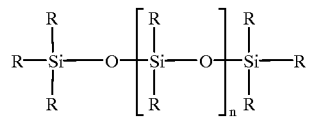

wherein n is an integer of from 0 to 8, inclusive,

R is independently alkenyl (e.g. vinyl), alkoxy, alkyl, or isoalkyl of 1 to 18 carbon atoms, provided however that each silicon atom has no more than one alkenyl substituent attached thereto, and the molar ratio of alkenyl to alkoxy substituents is 1:1 to 1:8, and the molar ratio of alkenyl to alkyl substituents is 1:0 to 1:8, and the alkenyl content of the oligomer is between 6 and 12 weight percent.

As shown above, the oligomer includes both alkyl and vinyl silanes. The amount of the oligomer used to treat the ground ATH is preferably in the range of from about 0.5% to about 5% by weight. It has been discovered that by decreasing the vinyl content in the silanes, a substantial increase in elongation can be obtained with only a slight loss in tensile strength and/or wet electrical performance. The dilution of the vinyl content minimizes the interfacial coupling between the resin (e.g. polyolefin compound) and the treated ground ATH. This is particularly important in peroxide or radiation cured polyolefin compounds for the following reason. During a peroxide or radiation cure, the vinyl groups attached to the ATH form covalent bonds that couple the resin. As the ATH surface area increases, the compound elongation decreases and the tensile strength increases. In the preferred embodiment, the vinyl content is no more than 12% by weight. It should be noted that the ground ATH particles have a relatively high surface area. Accordingly, the controlling of the interfacial bonding between the resin and the ATH is particularly important to meet elongation specifications.

A preferred method of treating the ground ATH product with an oligomeric silane follows. Initially, approximately 98.5 to 99 parts by weight of ground ATH (e.g., Micral® 1500 ATH) is added to a batch blender. The blender is then heated to approximately 90°–100° C. The blender is turned on and 1 to 1.5 parts by weight of an oligomer of vinyltrimethoxy and isobutyltrimethoxy silanes is added over approximately 5 to 7 minutes. The total mixing time is preferably about 30 minutes. Hydrolysis occurs and condensation on the surface of the ATH causes the oligomer to attach thereto. Heat accelerates the hydrolysis reaction. It should be noted that the oligomer is preferably fully dispersed prior to hydrolysis. Otherwise, it will begin to thicken.

Table III sets forth some variable physical properties of the oligomeric silane treated GATH product as well as the testing method.

TABLE III

| parameter | testing method | value |
| --- | --- | --- |
| median particle size, microns | sedigraph | 0.5–2.5 |
| Surface Area, m³/g | BET* | 8–30 |
| Moisture, %, as produced | ASTM D-280 | 0.1–0.5 |
| conductivity, micromh | ASTM D-2448 | 130–300 |

*Surface area is determined by the BET nitrogen adsorption methods of Brunaur et al., J. Am. Chem. Soc., 60, 309 (1938).

EXAMPLE 1

A polymeric wire and cable formulation was prepared from 100 wt. parts of an ethylene propylene rubber (EPDM resin; Nordel 2722 sold by Dupont), 1.5 wt. parts of an antioxidant (AgeRite Resin D sold by R. T. Vanderbilt), 5 wt. parts paraffin wax, 5 parts zinc oxide, 150 parts of silane treated ATH, and 3 parts of bis(t-butylperoxy) diisopropyl benzene (VulCup 40KE sold by Hercules). The formulation was prepared in a Banbury type mixer using the following mixing procedure. The EPDM resin was added to the mixer at 90° C. to 100° C. at 20 rpm. After the resin fluxed, the antioxidant, wax, zinc oxide and silane treated ATH were added to the mixer and the speed was increased to 45 rpm. The peroxide was then added and the ingredients are mixed together.

Table IV compares the properties in a Nordel 2722 test recipe of a precipitated ATH product treated in-situ with RC-1 and a ground ATH product treated with an oligomeric silane in accordance with the present invention.

TABLE IV

| | Precipitated ATH | Oligomeric Silane Treated Ground ATH |
| --- | --- | --- |
| Final Mix Torque, Brabender, m-g | 12,700 | 10,000 |
| Modulus at 100%, psi | 1,333 | 1,436 |
| Tensile, psi | 1,812 | 1,506 |
| Elongation | 197 | 190 |
| Compound Water Adsorption 168 hours, 82° C., mg/inch² | 10.8 | 9.7 |
| AC Loss Properties 60 Hz, 40 volts/mil | | |
| Dielectric Constant | 3.15 | 3.11 |
| Dissipation Factor | 0.61 | 0.28 |
| Flame Retardant Properties | | |
| Oxygen Index % | 26 | 27 |
| ASTM E-662, Smoke Density Flaming | | |
| Dm @ 1.5 min | 2 | 1 |
| Dm @ 4.0 min | 11 | 5 |
| Dm | 178 | 195 |
| Dmcorr | 177 | 194 |
| Time to Dm (min) | 19.5 | — |
| Non-Flaming | | |
| Dm @ 1.5 min | 0 | 0 |
| Dm @ 4.0 min | 17 | 18 |
| Dm | 307 | 257 |
| Dmcorr | 306 | 255 |
| Time to Dm (min) | 20.0 | 20.0 |
| Cone Calorimeter, 35 kW/km² | | |
| Peak Heat Release Rate, (kW/m²) | 164 | 120.4 |
| Peak Heat Release Time (sec) | 489 | 228 |
| Average Heat Release (kW/m²) | 123.2 | 71.0 |
| Total Heat Release (MJ/m²) | 83.0 | 84.7 |
| Average Effective Heat of Combustion (MJ/kg) | 28.7 | 49.5 |
| Average Specific Ext. Area (m²/kg) | 323.6 | 24.6 |
| Average Mass Loss Rate | 4.43 | 2.42 |
| Time to Ignition (sec) | 166.6 | 147.3 |

As can be seen in Table IV, the viscosity of the formulation containing the oligomeric silane treated ground ATH is significantly lower than the viscosity of the formulation containing precipitated ATH (as represented by the mixing torque). Further, mechanical properties (i.e., elongation), flame retardant and smoke suppressant properties are substantially improved without a significant loss in the electrical properties.

Table V lists 10 oligomeric silanes and their vinyl content.

TABLE V

| Oligomeric Silanes | | |
| --- | --- | --- |
| A | Vinylmethyl silsesquioxane methoxy terminated | 12% vinyl |
| B | Vinymethyl silsesquioxane ethoxy terminated | 12% vinyl |
| C | Vinyl-isobutyl silsesquioxane methoxy terminated | 12% vinyl |
| D | Vinyl-isobutyl silsesquioxane ethoxy terminated | 12% vinyl |
| E | Vinyl-isobutyl silsesquioxane methoxy terminated | 10% vinyl |
| F | Vinyl-isobutyl silsesquioxane ethoxy terminated | 10% vinyl |
| G | Vinyl-isobutyl silsesquioxane methoxy terminated | 8% vinyl |
| H | Vinyl-isobutyl silsesquioxane ethoxy terminated | 8% vinyl |
| I | Vinyl-isobutyl silsesquioxane methoxy terminated | 6% vinyl |
| J | Vinyl-isobutyl silsesquioxane ethoxy terminated | 6% vinyl |

Each of the silanes listed in Table V was pretreated on a Micral® 1500 ATH product at 1.5% by weight. The ATH was blended with each silane in a Henschel blender for ten minutes with an end temperature of 50° C. A Micral® 1500 ATH product was also treated with the RC-1 silane. Float testing was performed on all of the samples immediately after treatment and again 24 hours and 144 hours after treatment in order to determine how quickly the silanes bonded with the metal hydroxide. The float tests involved adding 10 grams of the treated metal hydroxide to 100 ml of water in a 4 ounce bottle and vigorously shaking the same. The two silanes made from methyl and vinyl silane precursors (samples A and B) outperformed RC-1 in the float tests (i.e. reacted faster) but did not do as well as samples C through J (silanes produced from isobutyl and vinyl silanes). Samples C through J bonded almost immediately to the metal hydroxide. Such rapid bonding increases the rate of processing and reduces manufacturing costs.

Each of the treated products was added to the following polymeric formulations: an ethylene-octene copolymer available under the tradename CL-8002 (available from Dow Chemical), an EVA (available under the name Elvax 265 from Dupont) and an EPDM (available under the name Nordel 2722 from Dupont). Each of the polymeric formulations was prepared in a manner similar to the method set forth in Example 1.

Tables VI, VII and VIII set forth application test results for the RC-1 treated and oligomeric treated ATH products. Each of the tables contain the silane description, the mixing torque (which serves as a crude measure of compound viscosity), original and heat aged physical properties, compound water adsorption (CL8002 and EPDM only) and wet and dry electrical properties (C18002 and EPDM only).

TABLE VI

Silane Treated Micral ® 1500 Filled CL8002 Test Recipe

| silane type | RC-1 | A | B | C | D | E | F | G | H | I | J |
|---|---|---|---|---|---|---|---|---|---|---|---|
| Ten Oligomeric Vinyl Silanes versus RC-1 in a Micral 1500 Filled CL8002 Test Recipe | | | | | | | | | | | |
| treatment level | Med. | Med. | Med. | Med. | Med. | Med. | Med. | Med. | Med. | Med. | Med. |
| ethoxy/methoxy | E | M | E | M | E | M | E | M | E | M | E |
| vinyl content, % | | 12 | 12 | 12 | 12 | 10 | 10 | 8 | 8 | 6 | 6 |
| Brabender, Final Torque, m-g | 13,000 | 13,200 | 13,100 | 12,400 | 12,900 | 12,000 | 12,800 | 12,000 | 12,450 | 11,800 | 12,200 |
| Physical Properties - Original | | | | | | | | | | | |
| Modulus 100%, psi | 1,970 | 2,079 | 2,141 | 1,946 | 2,024 | 1,853 | 1,910 | 1,655 | 1,720 | 1,558 | 1,633 |
| Tensile, psi | 2,296 | 2,366 | 2,623 | 2,285 | 2,449 | 2,075 | 2,396 | 1,852 | 2,142 | 1,705 | 1,951 |
| Elongation, % | 182 | 132 | 156 | 193 | 167 | 217 | 189 | 252 | 194 | 267 | 248 |
| Physical Properties - Heat Aged 7 days 168 hours at 121° C. | | | | | | | | | | | |
| % Retention Tensile | 112 | 115 | 108 | 117 | 112 | 117 | 110 | 119 | 114 | 112 | 115 |
| % Retention Elongation | 93 | 109 | 100 | 85 | 98 | 85 | 87 | 91 | 106 | 105 | 82 |
| Compound Water Adsorption 168 hrs 72° C., mg/inch$^2$ | 5.3 | 2.0 | 4.0 | 3.4 | 5.0 | 4.6 | 4.6 | 6.1 | 7.3 | 7.1 | 10.5 |
| AC Loss Properties 60 Hz, 40 volts/mil | | | | | | | | | | | |
| Dielectric Constant | | | | | | | | | | | |
| Original | 3.12 | 3.17 | 3.16 | 3.15 | 3.13 | 3.03 | 3.13 | 3.05 | 3.10 | 3.17 | 3.11 |
| 7 days, 75° C. H$_2$O | 4.59 | 4.60 | 4.37 | 4.44 | 4.44 | 4.40 | 4.43 | 4.37 | 4.51 | 4.72 | 4.54 |
| 14 days, 75° C. H$_2$O | 4.62 | 4.70 | 4.47 | 4.51 | 4.50 | 4.47 | 4.45 | 4.40 | 4.57 | 4.82 | 4.51 |
| Dissipation Factor Original | 0.35 | 0.31 | 0.33 | 0.30 | 0.31 | 0.30 | 0.38 | 0.31 | 0.33 | 0.32 | 0.37 |
| 7 days, 75° C. H$_2$O | 6.79 | 6.57 | 5.81 | 6.06 | 6.29 | 5.92 | 6.34 | 5.60 | 6.11 | 6.35 | 6.55 |
| 14 days, 75° C. H$_2$O | 6.87 | 6.79 | 6.02 | 6.08 | 6.42 | 5.93 | 6.44 | 5.61 | 6.22 | 6.63 | 6.53 |

TABLE VII

Silane Treated Micral ® 1500 Filled Elvax 265 Test Recipe

| Silane Type | RC-1 | A | B | C | D | E | F | G | H | I | J |
|---|---|---|---|---|---|---|---|---|---|---|---|
| Ten Oligomeric Vinyl Silanes versus RC-1 in a Micral 1500 Filled XL Elvax 265 Test Recipe | | | | | | | | | | | |
| Treatment Level | Med. | Med. | Med. | Med. | Med. | Med. | Med. | Med. | Med. | Med. | Med. |
| Ethoxy/Methoxy | E | M | E | M | E | M | E | M | E | M | E |
| Vinyl Content, % | | 12 | 12 | 12 | 12 | 10 | 10 | 8 | 8 | 6 | 6 |
| Brabender, Final Torque, m-g | 9,400 | 9,400 | 9,200 | 9,000 | 9,200 | 9,100 | 9,200 | 9,200 | 9,400 | 8,900 | 9,300 |
| Physical Properties - Original | | | | | | | | | | | |
| Yield, psi | 2,513 | 2,659 | 2,558 | 2,475 | 2,490 | 2,218 | 2,490 | 2,209 | 2,315 | 2,053 | 2,143 |
| Tensile, psi | 2,770 | 2,934 | 2,816 | 2,682 | 2,737 | 2,392 | 2,737 | 2,331 | 2,562 | 2,153 | 2,301 |
| Elongation, % | 159 | 139 | 138 | 167 | 154 | 188 | 177 | 195 | 175 | 248 | 206 |
| Physical Properties - Heat Aged 7 days 168 hours at 121° C. | | | | | | | | | | | |
| % Retention Tensile | 110 | 100 | 104 | 107 | 110 | 117 | 109 | 109 | 111 | 112 | 113 |
| % Retention Elongation | 103 | 80 | 87 | 92 | 94 | 97 | 89 | 82 | 103 | 77 | 101 |

TABLE VIII

Silane Treated Micral ® 1500 Filled Nordel 2722 Test Recipe

| Silane Type | RC-1 | A | B | C | D | E | F | G | H | I | J |
|---|---|---|---|---|---|---|---|---|---|---|---|
| Ten Silanes versus RC-1 in a Micral 1500 Filled Nordel 2722 Test Recipe | | | | | | | | | | | |
| Treatment Level | Med. | Med. | Med. | Med. | Med. | Med. | Med. | Med. | Med. | Med. | Med. |
| Ethoxy/Methoxy | E | M | E | M | E | M | E | M | E | M | E |
| Vinyl Content, % | | 12 | 12 | 12 | 12 | 10 | 10 | 8 | 8 | 6 | 6 |
| Brabender, Final Torque, m-g | 10,800 | 10,900 | 10,700 | 10,200 | 10,600 | 10,400 | 10,500 | 10,300 | 10,400 | 10,000 | 10,300 |
| Physical Properties - Original | | | | | | | | | | | |
| Modulus 100%, psi, | 751 | 1,737 | 1,844 | 1,716 | 1,717 | 1,549 | 1,706 | 1,502 | 1,634 | 1,449 | 1,537 |
| Tensile, psi | 1,991 | 2,026 | 2,132 | 1,973 | 2,047 | 1,777 | 1,937 | 1,654 | 1,906 | 1,539 | 1,728 |
| Elongation, % | 144 | 138 | 140 | 153 | 148 | 189 | 154 | 198 | 164 | 194 | 201 |
| Physical Properties - Heat Aged 7 days 168 hours at 121° C. | | | | | | | | | | | |
| % Retention Tensile | 105 | 102 | 101 | 105 | 105 | 111 | 109 | 115 | 107 | 109 | 112 |
| % Retention Elongation | 96 | 90 | 94 | 86 | 91 | 77 | 83 | 80 | 86 | 98 | 73 |
| Compound Water Adsorption 168 hrs 72° C., mg/inch$^2$ | | | | | | | | | | | |
| | 9.0 | 6.6 | 6.4 | 8.5 | 8.0 | 9.2 | 9.2 | 10.4 | 10.0 | 12.6 | 13.1 |
| AC Loss Properties 60 Hz, 40 volts/mil | | | | | | | | | | | |
| Dielectric Constant | | | | | | | | | | | |
| Original | 3.09 | 3.03 | 3.06 | 2.99 | 3.17 | 3.00 | 3.07 | 3.03 | 3.10 | 2.99 | 3.05 |
| 7 days, 75° C. H$_2$O | 4.11 | 4.05 | 4.09 | 3.98 | 4.19 | 4.42 | 4.05 | 4.01 | 3.99 | 4.04 | 3.96 |
| 14 days, 75° C. H$_2$O | 4.12 | 4.12 | 4.10 | 4.02 | 4.14 | 4.01 | 4.00 | 4.06 | 4.01 | 4.09 | 3.98 |
| Dissipation Factor | | | | | | | | | | | |
| Original | 0.28 | 0.28 | 0.29 | 0.27 | 0.27 | 0.25 | 0.27 | 0.27 | 0.27 | 0.27 | 0.28 |
| 7 days, 75° C. H$_2$O | 4.35 | 4.56 | 4.63 | 4.74 | 4.74 | 4.77 | 4.81 | 4.92 | 4.78 | 5.38 | 4.86 |
| 14 days, 75° C. H$_2$O | 4.36 | 4.60 | 4.66 | 4.76 | 4.71 | 4.82 | 4.70 | 4.91 | 4.69 | 5.29 | 4.79 |

As can be seen in Tables VI, VII and VIII, elongation performance improved with decreasing vinyl content. Compound water adsorption suffered as vinyl content decreased. Further, the electrical properties between all of the different silanes only show modest differences. ATH products treated with oligomeric silanes I and J appear to provide the best overall performance in all three model formulations. Note, oligomeric silanes A through J are described in Table V.

Tables IX, X and XI demonstrate the effect of treatment levels of two oligomeric silanes, I and J, on Micral® 1500 ATH. RC-1 treated Micral®1500 and four precipitated grades, Micral® 9400, H710 (1 micron PATH produced by Alcon), OL104 (1.5 micron PATH produced by Martinswerk) and OL107 (1.0 micron produced by Martinswerk), were included in the application testing. The precipitated grades were not pretreated. Rather, RC-1 at 1% by weight was added in situ. In the application testing, the Micral® 1500 product was surface treated by blending in each oligomeric silane in a Henschel mixture for 10 minutes with a start temperature of 30° C. and a finish temperature of 50° C. Treatment levels were 1.0% (low), 1.5% (medium) and 2.0% (high).

TABLE IX

Effect of Silane Treatment Level on Micral ® 1500 Filled CL8002 Test Recipe

| MICRAL 1500 | | | | | | | | | | M9400 |
|---|---|---|---|---|---|---|---|---|---|---|
| Treatment Level | Low | Med. | High | Low | Med. | High | Low | Med | High | Std. |
| Silane Type | RC-1 | RC-1 | RC-1 | J | J | J | I | I | I | RC-1 |
| Ethoxy/Methoxy | E | E | E | E | E | E | M | M | M | E |
| Vinyl Content | | | | | 6 | 6 | 6 | 6 | 6 | 6 |
| Brabender, Final Torque, m-g | 13,600 | 13,200 | 13,000 | 12,400 | 12,200 | 12,100 | 12,000 | 11,900 | 11,600 | 15,600 |
| Physical Properties - Original | | | | | | | | | | |
| Modulus 100%, psi | 1,899 | 1,996 | 2,022 | 1,655 | 1,630 | 1,760 | 1,591 | 1,522 | 1,645 | 1,396 |
| Tensile, psi | 2,282 | 2,407 | 2,435 | 1,921 | 1,912 | 2,073 | 1,716 | 1,707 | 1,780 | 2,106 |

TABLE IX-continued

Effect of Silane Treatment Level on Micral ® 1500 Filled CL8002 Test Recipe

| | | | | | | | | | | |
|---|---|---|---|---|---|---|---|---|---|---|
| Elongation, % | 186 | 167 | 169 | 239 | 228 | 205 | 273 | 275 | 234 | 226 |
| Physical Properties - Heat Aged 7 days 168 hours at 121° C. | | | | | | | | | | |
| % Retention Tensile | 115 | 115 | 113 | 117 | 124 | 122 | 120 | 123 | 115 | 111 |
| % Retention Elongation | 91 | 96 | 92 | 93 | 89 | 91 | 90 | 87 | 106 | 93 |
| Compound Water Adsorption 168 hrs 72° C., mg/inch² | 7.1 | 5.3 | 1.2 | 10.7 | 7.2 | 5.0 | 9.2 | 6.2 | 3.9 | 6.6 |
| AC Loss Properties 60 Hz, 40 volts/mil | | | | | | | | | | |
| Dielectric Constant | | | | | | | | | | |
| Original | 3.01 | 3.20 | 3.07 | 3.10 | 3.04 | 3.02 | 3.16 | 3.08 | 3.04 | 3.05 |
| 7 days, 75° C. H₂O | 4.92 | 4.53 | 4.20 | 4.55 | 4.24 | 4.29 | 4.63 | 4.43 | 4.37 | 4.35 |
| 14 days, 75° C. H₂O | 4.88 | 4.61 | 4.26 | 4.61 | 4.30 | 4.32 | 4.68 | 4.51 | 4.33 | 4.41 |
| 4 hours 100° C. oven | 3.34 | 3.21 | 3.08 | 3.15 | 2.99 | 3.05 | 3.17 | 3.11 | 3.09 | 3.06 |
| Dissipation Factor | | | | | | | | | | |
| Original | 0.34 | 0.33 | 0.31 | 0.33 | 0.32 | 0.32 | 0.32 | 0.32 | 0.32 | 0.60 |
| 7 days, 75° C. H₂O | 7.03 | 6.38 | 6.00 | 7.17 | 6.49 | 6.33 | 7.01 | 6.18 | 5.88 | 6.60 |
| 14 days, 75° C. H₂O | 7.17 | 6.56 | 6.36 | 7.56 | 6.48 | 6.56 | 6.91 | 6.16 | 5.95 | 6.60 |
| 4 hours 100° C. oven | 0.47 | 0.51 | 0.50 | 0.46 | 0.49 | 0.47 | 0.49 | 0.49 | 0.53 | 0.95 |

| | MICRAL 1500 | H710 | OL104 | OL107 |
|---|---|---|---|---|
| Treatment Level | | Std. | Std. | Std. |
| Silane Type | | RC-1 | RC-1 | RC-1 |
| Ethoxy/Methoxy | | E | E | |
| Vinyl Content | | | | |
| Brabender, Final Torque, m-g | | 16,350 | 14,700 | 14,600 |
| Physical Properties - Original | | | | |
| Modulus 100%, psi | | 1,284 | 1,275 | 1,641 |
| Tensile, psi | | 1,914 | 1,743 | 2,242 |
| Elongation, % | | 286 | 278 | 238 |
| Physical Properties - Heat Aged 7 days 168 hours at 121° C. | | | | |
| % Retention Tensile | | 115 | 119 | 120 |
| % Retention Elongation | | 88 | 94 | 88 |
| Compound Water Adsorption 168 hrs 72° C., mg/inch² | | 2.0 | 14.1 | 32.7 |
| AC Loss Properties 60 Hz, 40 volts/mil | | | | |
| Dielectric Constant | | | | |
| Original | | 3.18 | 3.31 | 3.24 |
| 7 days, 75° C. H₂O | | 4.03 | 8.74 | 10.57 |
| 14 days, 75° C. H₂O | | 4.11 | 9.21 | 9.92 |
| 4 hours 100° C. oven | | 3.18 | 3.33 | 3.27 |
| Dissipation Factor | | | | |
| Original | | 0.57 | 0.72 | 0.71 |
| 7 days, 75° C. H₂O | | 5.09 | 21.1 | 36.4 |
| 14 days, 75° C. H₂O | | 5.61 | 23.01 | 29.74 |
| 4 hours 100° C. oven | | 0.78 | 1.04 | 1.43 |

TABLE X

Effect of Silane Treatment Level on Micral ® 1500 Filled Elvax 265 Test Recipe

| MICRAL 1500 | | | | | | | | | | M9400 |
|---|---|---|---|---|---|---|---|---|---|---|
| Treatment Level | Low | Med. | High | Low | Med. | High | Low | Med | High | Std. |
| Silane Type | RC-1 | RC-1 | RC-1 | J | J | J | I | I | I | RC-1 |
| Ethoxy/Methoxy | E | E | E | E | E | E | M | M | M | E |
| Vinyl Content | | | | 6 | 6 | 6 | 6 | 6 | 6 | 6 |
| Brabender, Final Torque, m-g | 9,000 | 9,200 | 8,900 | 8,900 | 8,800 | 8,600 | 9,000 | 8,700 | 8,500 | 10,800 |
| Physical Properties - Original | | | | | | | | | | |
| Yield, psi | 2,486 | 2,604 | 2,549 | 2,201 | 2,250 | 2,322 | 2,121 | 2,149 | 2,176 | 1,808 |
| Tensile, psi | 2,716 | 2,861 | 2,830 | 2,334 | 2,459 | 2,576 | 2,234 | 2,261 | 2,316 | 2,446 |
| Elongation, % | 182 | 164 | 147 | 189 | 206 | 179 | 202 | 230 | 223 | 216 |
| Physical Properties - Heat Aged 7 days 168 hours at 121° C. | | | | | | | | | | |
| % Retention Tensile | 110 | 90 | 108 | 110 | 110 | 110 | 111 | 107 | 108 | 92 |
| % Retention Elongation | 84 | 54 | 92 | 84 | 83 | 94 | 104 | 76 | 88 | 93 |

| MICRAL 1500 | H710 | OL104 | OL107 |
|---|---|---|---|
| Treatment Level | Std. | Std. | Std. |
| Silane Type | RC-1 | RC-1 | RC-1 |
| Ethoxy/Methoxy | E | E | E |
| Vinyl Content | | | |
| Brabender, Final Torque, m-g | 11,400 | 9,950 | 10,300 |
| Physical Properties - Original | | | |
| Yield, psi | 1,591 | 1,594 | 1,988 |
| Tensile, psi | 2,262 | 2,044 | 2,464 |
| Elongation, % | 264 | 247 | 205 |
| Physical Properties - Heat Aged 7 days 168 hours at 121° C. | | | |
| % Retention Tensile | 112 | 111 | 112 |
| % Retention Elongation | 96 | 85 | 94 |

TABLE XI

Effect of Silane Treatment Level on Micral ® 1500 Filled Nordel 2722 Test Recipe

| MICRAL 1500 | | | | | | | | | | M9400 |
|---|---|---|---|---|---|---|---|---|---|---|
| Treatment Level | Low | Med. | High | Low | Med. | High | Low | Med | High | Std. |
| Silane Type | RC-1 | RC-1 | RC-1 | J | J | J | I | I | I | RC-1 |
| Ethoxy/Methoxy | E | E | E | E | E | E | M | M | M | E |
| Vinyl Content | | | | 6 | 6 | 6 | 6 | 6 | 6 | 6 |
| Brabender, Final Torque, m-g | 10,600 | 10,600 | 10,600 | 10,450 | 10,200 | 10,000 | 10,200 | 10,000 | 9,800 | 12,700 |
| Physical Properties - Original | | | | | | | | | | |
| Modulus 100%, psi | 1,649 | 1,722 | 1,830 | 1,517 | 1,515 | 1,505 | 1,420 | 1,436 | 1,445 | 1,333 |
| Tensile, psi | 1,962 | 2,035 | 2,082 | 1,683 | 1,660 | 1,745 | 1,536 | 1,506 | 1,523 | 1,812 |
| Elongation, % | 156 | 144 | 136 | 190 | 175 | 183 | 206 | 190 | 200 | 197 |
| Physical Properties - Heat Aged 7 days 168 hours at 121° C. | | | | | | | | | | |
| % Retention Tensile | 111 | 106 | 105 | 120 | 122 | 122 | 122 | 124 | 118 | 100 |
| % Retention Elongation | 83 | 80 | 98 | 76 | 70 | 73 | 79 | 79 | 80 | 85 |
| Compound Water Adsorption 168 hrs 72° C., mg/inch$^2$ | 10.9 | 7.8 | 7.3 | 14.8 | 11.7 | 10.1 | 14.6 | 9.7 | 8.7 | 10.8 |
| AC Loss Properties 60 Hz, 40 volts/mil | | | | | | | | | | |
| Dielectric Constant | | | | | | | | | | |
| Original | 3.10 | 3.10 | 3.08 | 3.05 | 3.10 | 3.09 | 3.05 | 3.11 | 3.13 | 3.15 |
| 7 days, 75° C. H$_2$O | 4.30 | 4.19 | 4.06 | 4.35 | 4.13 | 4.13 | 4.31 | 4.19 | 4.09 | 4.35 |
| 14 days, 75° C. H$_2$O | 4.30 | 4.22 | 4.12 | 4.31 | 4.19 | 4.15 | 4.32 | 4.23 | 4.13 | 4.41 |

TABLE XI-continued

Effect of Silane Treatment Level on Micral ® 1500 Filled Nordel 2722 Test Recipe Dissipation Factor

| | | | | | | | | | | |
|---|---|---|---|---|---|---|---|---|---|---|
| Original | 0.32 | 0.30 | 0.27 | 0.30 | 0.26 | 0.30 | 0.31 | 0.28 | 0.30 | 0.61 |
| 7 days, 75° C. H$_2$O | 5.62 | 4.79 | 4.46 | 6.31 | 5.14 | 5.11 | 6.06 | 5.25 | 5.07 | 5.09 |
| 14 days, 75° C. H$_2$O | 5.49 | 4.86 | 4.63 | 6.10 | 5.19 | 5.15 | 6.02 | 5.26 | 5.11 | 5.16 |

| | MICRAL 1500 | H710 | OL104 | OL107 |
|---|---|---|---|---|
| Treatment Level | | Std. | Std. | Std. |
| Silane Type | | RC-1 | RC-1 | RC-1 |
| Ethoxy/Methoxy | | E | E | E |
| Vinyl Content | | | | |
| Brabender, Final Torque, m-g | | 13,200 | 11,750 | 12,400 |
| Physical Properties - Original | | | | |
| Modulus 100%, psi | | 1,235 | 1,210 | 1,508 |
| Tensile, psi | | 1,736 | 1,496 | 1,948 |
| Elongation, % | | 227 | 231 | 178 |
| Physical Properties - Heat Aged 7 days 168 hours at 121° C. | | | | |
| % Retention Tensile | | 113 | 128 | 114 |
| % Retention Elongation | | 81 | 78 | 84 |
| Compound Water Adsorption 168 hrs 72° C., mg/inch$^2$ | | 7.2 | 15.3 | 42.1 |
| AC Loss Properties 60 Hz, 40 volts/mil | | | | |
| Dielectric Constant | | | | |
| Original | | 3.25 | 3.28 | 3.30 |
| 7 days, 75° C. H$_2$O | | 4.08 | 8.17 | 8.41 |
| 14 days, 75° C. H$_2$O | | 4.17 | 8.25 | 7.85 |
| Dissipation Factor | | | | |
| Original | | 0.69 | 0.62 | 0.63 |
| 7 days, 75° C. H$_2$O | | 4.03 | 22.8 | 25.68 |
| 14 days, 75° C. H$_2$O | | 4.35 | 22.00 | 19.24 |

Table IX demonstrates the compound water adsorption advantage of compositions containing a treated GATH product at 2% by weight versus 1% and 1.5%. Dissipation factor is moderately better at the 2% treatment level. Elongation suffers with increasing treatment level making it impossible to obtain maximum water resistance and wet electricals in conjunction with high elongation. Table X shows the same elongation trend in an EVA jacket compound. Water adsorption and electrical properties were not measured. Table XI shows the same trends and relationships in an EPDM compound.

As can be seen compositions containing a GATH product treated with oligomeric silane I and J offer a better balance of low compound water adsorption, good wet electrical performance and higher elongation values. Elongation values obtained with oligomeric silane I far exceed those obtained with RC-1 on Micral®1500 and come close to matching the values obtained with precipitated grades.

The silanes listed in Table V were also used to pre-treat a magnesium hydroxide product available under the mark Zerogen® 50 by J. M. Huber Corporation. The magnesium hydroxide was blended with each silane (at 1.5% by wt.) in a Henschel blender for 10 minutes with an end temperature of 50° C. Float testing once again revealed that the bonding between the oligomeric silanes of the present invention and the metal hydroxide occurred at a much faster rate than the bonding of the RC-1 and the metal hydroxide. Each of the treated products was added to an EPDM formulation (available under the name Nordel 2722 from Dupont). Table XII sets forth application test results for the RC-1 treated and oligomeric treated magnesium hydroxide products.

TABLE XII

Silane Treated Zerogen ® 50 Filled Nordel 2722 Test Recipe

| Silane Type | RC-1 | A | B | C | D | E | F | G | H | I | J |
|---|---|---|---|---|---|---|---|---|---|---|---|
| Treatment Level | Med. | Med. | Med. | Med. | Med. | Med. | Med. | Med. | Med. | Med. | Med. |
| Ethoxy/Methoxy | E | M | E | M | E | M | E | M | F | M | E |
| Vinyl Content, % | | 12 | 12 | 12 | 12 | 10 | 10 | 8 | 8 | 6 | 6 |
| Brabender, Final Torque, m-g | 12,000 | 12,000 | 12,000 | 11,400 | 11,400 | 11,300 | 11,600 | 11,200 | 11,400 | 11,100 | 11,350 |

TABLE XII-continued

Silane Treated Zerogen ® 50 Filled Nordel 2722 Test Recipe

| Silane Type | RC-1 | A | B | C | D | E | F | G | H | I | J |
|---|---|---|---|---|---|---|---|---|---|---|---|
| Physical Properties - Original | | | | | | | | | | | |
| Modulus 100%, psi, | 1,758 | 1,664 | 1,798 | 1,529 | 1,753 | 1,476 | 1,667 | 1,412 | 1,692 | 1,406 | 1,541 |
| Tensile, psi | 2,031 | 1,996 | 2,103 | 1,720 | 2,029 | 1,643 | 1,937 | 1,581 | 1,944 | 1,490 | 1,727 |
| Elongation, % | 165 | 169 | 141 | 172 | 150 | 188 | 169 | 187 | 171 | 186 | 183 |
| Physical Properties - Heat Aged 7 days 168 hours at 121° C. | | | | | | | | | | | |
| % Retention Tensile | 111 | 108 | 110 | 117 | 111 | 115 | 119 | 115 | 114 | 113 | 115 |
| % Retention Elongation | 90 | 83 | 91 | 95 | 97 | 85 | 88 | 96 | 94 | 110 | 90 |
| Compound Water Adsorption 168 hrs 72° C., mg/inch$^2$ | 7.2 | 7.4 | 5.3 | 7.5 | 6.6 | 8.3 | 5.8 | 7.9 | 7.3 | 9.3 | 8.4 |
| AC Loss Properties 60 Hz, 40 volts/mil | | | | | | | | | | | |
| Dielectric Constant | | | | | | | | | | | |
| Original, 100° C. × 2 hr degass | 3.09 | 3.14 | 3.08 | 3.08 | 3.18 | 3.09 | 3.07 | 3.14 | 3.08 | 3.07 | 3.06 |
| Original @ 24 hr 23° C., 50% rh | 3.09 | 3.13 | 3.09 | 3.09 | 3.17 | 3.12 | 3.08 | 3.12 | 3.10 | 3.08 | 3.06 |
| 7 days, 75° C. H$_2$O | 3.62 | 3.86 | 3.56 | 3.74 | 3.66 | 3.87 | 3.56 | 3.95 | 3.63 | 4.04 | 3.78 |
| 14 days, 75° C. H$_2$O | 3.62 | 3.83 | 3.55 | 3.67 | 3.62 | 3.73 | 3.55 | 3.80 | 3.60 | 3.82 | 3.69 |
| Dissipation Factor | | | | | | | | | | | |
| Original, 100° C. × 2 hr degass | 0.32 | 0.30 | 0.31 | 0.29 | 0.30 | 0.29 | 0.30 | 0.29 | 0.30 | 0.31 | 0.31 |
| Original @ 24 hr 23° C., 50% rh | 0.39 | 0.37 | 0.35 | 0.36 | 0.36 | 0.35 | 0.36 | 0.34 | 0.36 | 0.36 | 0.39 |
| 7 days, 75° C. H$_2$O | 4.32 | 7.01 | 4.89 | 6.86 | 5.16 | 7.45 | 5.13 | 7.02 | 5.69 | 7.25 | 6.47 |
| 14 days, 75° C. H$_2$O | 4.04 | 6.32 | 4.60 | 5.96 | 4.78 | 6.19 | 4.64 | 5.84 | 5.07 | 5.88 | 5.58 |

Table XII shows that gains in elongation at break can be obtained by decreasing the vinyl content of the oligomer. Oligomers based on methoxy provide higher elongation values and lower tensile strength values than their ethoxy counterparts. Oligomers based on ethoxy also yield lower water adsorption and better electrical values than their methoxy counterparts.

Table XIII shows the effect treating both a precipitated ATH product (H710) with RC-1 and oligomeric silanes E and F in an ATH filled Elvax 265 test recipe. As can be seen from Table XIII, compositions containing a precipitated ATH product treated with oligomeric silane E and F of the present invention, exhibit higher elongation values than a similar composition containing a PATH product treated with RC-1.

TABLE XIII

Silane Treated ATH filled Elvax 265 Test Recipe

| | H710 | | |
|---|---|---|---|
| Silane Type | RC-1 | E | F |
| Treatment Level | low | low | low |
| Ethoxy/Methoxy | E | M | E |

TABLE XIII-continued

Silane Treated ATH filled Elvax 265 Test Recipe

| | H710 | | |
|---|---|---|---|
| Silane Type | RC-1 | E | F |
| Vinyl Content, % | | 10 | 10 |
| Brabender, Final Torque, m-g | 11,400 | 10,800 | 11,100 |
| Physical Properties - Original | | | |
| 100% Modulus, psi | 1,591 | 1,633 | 1,458 |
| Tensile, psi | 2,262 | 2,143 | 1,843 |
| Elongation, % | 264 | 286 | 302 |

The present invention may be embodied in other specific forms without departing from the spirit or essential attributes thereof and accordingly reference should be made to the appended claims rather than the foregoing specification as indicating the scope of the invention.

What is claimed is:

1. An oligomeric silane treated metal hydroxide product for use in a polymeric composition comprising a plurality of ground metal hydroxide particles and an oligomer of the formula

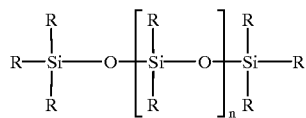

wherein n is an integer of from 0 to 8, inclusive,

R is independently alkenyl (e.g. vinyl), alkoxy, alkyl, or isoalkyl of 1 to 18 carbon atoms, provided however that each silicon atom has no more than one alkenyl substituent attached thereto, and the molar ratio of alkenyl to alkoxy substituents is 1:1 to 1:8, and the molar ratio of alkenyl to alkyl substituents is 1:0 to 1:8, and the alkenyl content of the oligomer is between 6 and 12 weight percent;

said ground metal hydroxide particles being surface treated by said oligomer.

2. An oligomeric silane treated ground metal hydroxide product for use in a polymeric composition comprising a plurality of metal hydroxide particles and an oligomer of a 2-alkenylalkoxy silane and an alkylalkoxy silane, said metal hydroxide particles being surface treated by said oligomer.

3. The product of claim 2 wherein said alkylalkoxy silane includes an alkyl group of 1 to 18 carbon atoms.

4. The product of claim 2 wherein said 2-alkenylalkoxy silane is a vinylalkoxy silane selected from the group consisting of vinyltrimethoxy silane and vinyltriethoxy silane.

5. The product of claim 2 wherein said alkylalkoxy silane is selected from the group consisting of isobutyltrimethoxy silane and isobutyltriethoxy silane.

6. The product of claim 2 wherein said oligomer of said 2-alkenylalkoxy and alkylalkoxy silanes includes an alkenyl content of less than about 12% by wt.

7. The product of claim 2 wherein said oligomer of said 2-alkenylalkoxy and alkylalkoxy silanes includes an alkenyl content of from about 6% to about 12% by wt.

8. The product of claim 2 wherein said ground metal hydroxide particles include ground alumina trihydrate particles.

9. The product of claim 2 wherein said ground metal hydroxide particles include ground magnesium hydroxide particles.

10. A method of preparing an oligomeric silane treated, ground metal hydroxide product comprising the steps of:

providing a plurality of ground metal hydroxide particles;

blending an oligomer of a 2-alkenylalkoxy silane and an alkylalkoxy silane with said ground metal hydroxide particles in an amount of from about 0.5% to about 5.0% by weight of said ground metal hydroxide particles, and drying said treated metal hydroxide product.

11. The method of claim 10 wherein heat is applied during the blending step with an end temperature of from about 90° C. to about 100° C.

12. The method of claim 10 wherein said oligomer of said 2-alkenylalkoxy and alkylalkoxy silanes includes an alkenyl content of less than about 12% by wt.

13. A polymeric composition comprising:

a polyolefin;

an oligomeric silane treated metal hydroxide product including a plurality of ground metal hydroxide particles and an oligomer of a 2-alkenylalkoxy silane and an alkylalkoxy silane, said metal hydroxide particles being surface treated by said oligomer.

14. The polymeric composition of claim 13 wherein said polyolefin is present in an amount of from about 35 to 40% by weight and said metal hydroxide product is present in an amount of from about 55 to 60% by weight.

15. The polymeric composition of claim 13 further including a peroxide in an amount of from about 0.5 to 1.5% by weight.

16. The polymeric composition of claim 13 wherein the composition has a tensile strength of from about 1500 to about 3000 psi, and a % elongation of from about 140 to about 280.

17. The polymeric composition of claim 13 wherein said 2-alkenylalkoxy silane is a vinylalkoxy silane selected from the group consisting of vinyltrimethoxy silane and vinyltriethoxy silane.

18. The polymeric composition of claim 13 wherein said alkylalkoxy silane includes an alkyl group of 1 to 18 carbon atoms.

19. The polymeric composition of claim 13 wherein said oligomer of said 2-alkenylalkoxy and alkylalkoxy silanes includes an alkenyl content of less than about 12% by wt.

20. The polymeric composition of claim 13 wherein said oligomer of said 2-alkenylalkoxy and alkylalkoxy silanes includes an alkenyl content of from about 6% to about 12% by wt.

21. The polymeric composition of claim 13 wherein said metal hydroxide particles are selected from the group consisting of aluminum trihydrate and magnesium hydroxide particles.

22. A silane treated metal hydroxide product according to claims 1 or 2 wherein said metal hydroxide product has a BET surface area of at least 8 and a particle size greater than 0.5.

23. The method of claim 10 wherein said treated metal hydroxide product has a BET surface area of at least 8 and a particle size greater than 0.5.

24. A polymeric composition according to claim 13 wherein said oligomeric silane treated metal hydroxide product has a BET surface area of at least 8 and a particle size greater than 0.5.

* * * * *